US011941159B2

(12) United States Patent
Stewart et al.

(10) Patent No.: US 11,941,159 B2
(45) Date of Patent: Mar. 26, 2024

(54) CONFIGURATION DATA DELETION BASED ON TAMPER STATUS

(71) Applicant: HEWLETT-PACKARD DEVELOPMENT COMPANY, L.P., Spring, TX (US)

(72) Inventors: Christopher Howard Stewart, Spring, TX (US); Jeffrey Kevin Jeansonne, Spring, TX (US); Richard Alden Bramley, Jr., Mansfield, MA (US); Maugan Cedric Villatel, Bristol (GB)

(73) Assignee: HEWLETT-PACKARD DEVELOMENT COMPANY, L.P., Spring, TX (US)

( * ) Notice: Subject to any disclaimer, the term of this patent is extended or adjusted under 35 U.S.C. 154(b) by 162 days.

(21) Appl. No.: 17/341,448

(22) Filed: Jun. 8, 2021

(65) Prior Publication Data
US 2022/0391545 A1 Dec. 8, 2022

(51) Int. Cl.
G06F 3/06 (2006.01)
G06F 21/31 (2013.01)
G06F 21/57 (2013.01)
G06F 21/60 (2013.01)
G06F 21/78 (2013.01)
G06F 21/86 (2013.01)

(52) U.S. Cl.
CPC ............ *G06F 21/78* (2013.01); *G06F 3/0622* (2013.01); *G06F 3/0629* (2013.01); *G06F 3/0683* (2013.01); *G06F 21/31* (2013.01); *G06F 21/602* (2013.01)

(58) Field of Classification Search
CPC ...... G06F 21/78; G06F 3/0622; G06F 3/0629; G06F 3/0683; G06F 21/31; G06F 21/602; G06F 2221/2143; G06F 21/86; G06F 21/575
See application file for complete search history.

(56) References Cited

U.S. PATENT DOCUMENTS 6,782,103 B1    8/2004  Arthan
6,874,092 B1 *  3/2005  Motoyama ............ G11C 29/74
                                            707/999.203
7,958,370 B2    6/2011  Hirai
9,705,855 B2    7/2017  Cignetti
(Continued)

*Primary Examiner* — Joseph P Hirl
*Assistant Examiner* — Aayush Aryal
(74) *Attorney, Agent, or Firm* — Knobbe, Martens, Olson & Bear, LLP

(57) ABSTRACT

An example storage medium includes instructions that, when executed, cause a processor of a computing device to read, during start-up of the computing device, first configuration data from a first storage device of the computing device; read second configuration data from a second storage device of the computing device; determine that there is an inconsistency between the first configuration data and the second configuration data; check a tamper status of the computing device; based on the tamper status and the determination that there is an inconsistency between the first configuration data and the second configuration data: (i) clear a secure storage location of the computing device, the secure storage location storing data to access protected data; or (ii) replace the first configuration data on the first storage device of the computing device based on second data and continue the start-up of the computing device.

15 Claims, 10 Drawing Sheets

(56) References Cited

U.S. PATENT DOCUMENTS

| | | | |
|---|---|---|---|
| 2008/0016228 A1* | 1/2008 | Cho | H04N 1/00307 |
| | | | 709/227 |
| 2010/0031368 A1* | 2/2010 | Park | G11B 23/28 |
| | | | 726/26 |
| 2011/0067095 A1* | 3/2011 | Leicher | H04L 63/12 |
| | | | 726/10 |
| 2017/0010875 A1* | 1/2017 | Martinez | G06F 21/60 |
| 2017/0046514 A1* | 2/2017 | Henry | H04L 9/0643 |
| 2017/0230179 A1 | 8/2017 | Mannan | |
| 2019/0028273 A1 | 1/2019 | Harras | |
| 2019/0149341 A1* | 5/2019 | Robison | H04L 9/0897 |
| | | | 713/156 |
| 2019/0364048 A1* | 11/2019 | Callaghan | H04L 63/0815 |

\* cited by examiner

CONFIGURATION DATA DELETION BASED ON TAMPER STATUS

BACKGROUND

Computer security encompasses protection of computer systems and networks from information disclosure, theft of, or damage to their hardware, software, or electronic data, as well as from the disruption or misdirection of the services they provide. In some cases, an attacker seeking to compromise the security of a computing device may have physical access to the computing device. This may permit physical tampering with components of the device, as part of an attempt to compromise the security of the computing device.

BRIEF DESCRIPTION OF THE DRAWINGS

Examples are further described hereinafter with reference to the accompanying drawings, in which.

DETAILED DESCRIPTION

Figure 1:
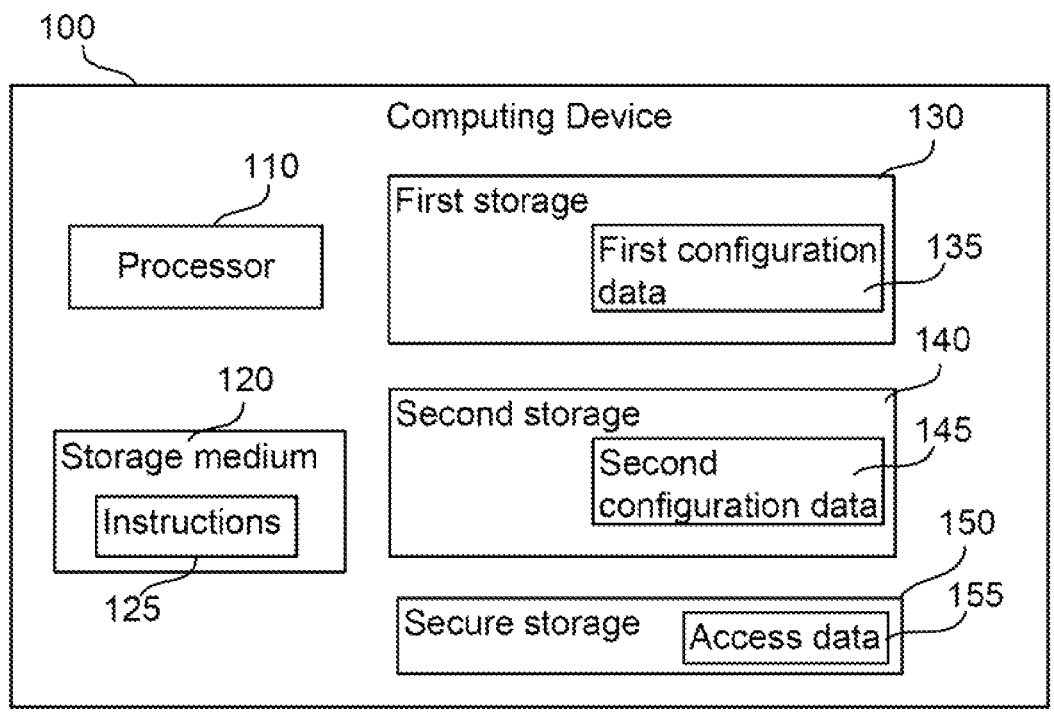
FIG. 1 shows an example of a computing device having first and second storage devices storing respective configuration data.

As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

When an attacker has physical access to a computing device, they may attempt to compromise the security of the device by tampering with the components of the device and the data stored on those components. For example, an attacker may attempt to alter, overwrite, or delete data stored on a storage device of the computing device in order to weaken or bypass security measures provided by the computing device.

An example of such an attack would be an attempt to remove configuration data or security information by removing a storage device of the computing device that stores the configuration data or security information, directly writing information to the storage device, and replacing the component in the computing device. For example, an attacker may delete or alter data stored in a Shared Serial Peripheral Interface (SPI) flash or a private SPI flash using an SPI programmer. This may remove or replace a security setting, such as a security token, a token for a BIOS administrator password, administrator keys, etc. If this tampering is not detected or mitigated by the computing device, security measures that have been configured in the computing device prior to the tampering may be circumvented or bypassed. For example, the computing device may be put into a state in which access to BIOS settings may be gained without authentication (e.g. where access is granted without a BIOS password being entered), or a security token (e.g. a token for the BIOS password) might be changed to one known by the attacker. In some computing devices, clearing all data on the private SPI storage may remove a BIOS security token (e.g. a token for a BIOS password), and this may result in a state in which access to BIOS settings may be gained without authentication (e.g. where access is granted without a BIOS password being entered). Other security settings may be reset by deleting them from the private SPI storage, e.g. where the default state in the absence of the setting is to deactivate the corresponding security measure. In some examples a security token may be a token for a BIOS administrator password. In some examples, a security token may provide an alternative to BIOS password entry for authenticating an administrator. Herein, a private SPI device may be a serial peripheral interface device, such as a storage device or flash storage device, that is electrically connected to an Endpoint Security Controller (EpSC or SC), but is not electrically connected with (i.e. is electrically isolated from) other devices. The EpSC may read directly from or write directly to the private SPI device, but other electrical devices of the computing device may be unable to read directly from or write directly to the private SPI device. The private SPI device may be external to the EpSC or may be contained in the EpSC. The private SPI device may be contrasted with a shared SPI device, which may be directly connected with a main CPU of the computing system (e.g. the main CPU may directly read from and directly write to a shared SPI device).

A shared SPI device may store the BIOS of the computing device. An EpSC may be an embedded controller (EC) or Super I/O device having an on-board processor. The EpSC may provide a secure, embedded context for certain firmware operations and data storage.

In some cases, firmware or data may be changed by an attacker to correspond to genuine but vulnerable data. For example, an older version of code that introduces a vulnerability (that has been fixed in the current version of the code) that can be exploited by the attacker. In some cases, this may defeat protections that validate the firmware or data, such as validating a source of the data (e.g. by code signing). In some examples security measures to validate data or code as belonging to the computing device (e.g. based on a hash of the data with Machine Unique Data (MUD) of a component of the computing device) may be defeated by using an old version of data or code previously copied from the same computing device.

For example, an attacker may attempt to replace the current firmware with an older (genuine, signed) version that includes a vulnerability in order to exploit the vulnerability. In another example, the attacker may replace current security data with older data from the same computing device, where the older data is advantageous for the attacker. For example, replacing a security token (such as a token for a password, a password hash, etc.) with a compromised security token (e.g. the token of an older password that is known by the attacker) could give the attacker access to the information or resources protected by the security token. In another example, the security data my indicate which security measures are to be implemented by the computing device, and replacing current security data with old data Indicating fewer active security measures may assist in an attack.

FIG. 1 shows a computing device 100 according to an example. The computing device 100 includes a processor 110 for executing instructions 125 stored on a storage medium 120. The computing device 100 also includes a first storage device 130 to store first configuration data 135. A second storage device 140 is to store second configuration data 145. The computing device 100 also includes secure storage location 150 to store data 155 to provide access protected data.

Figure 2:
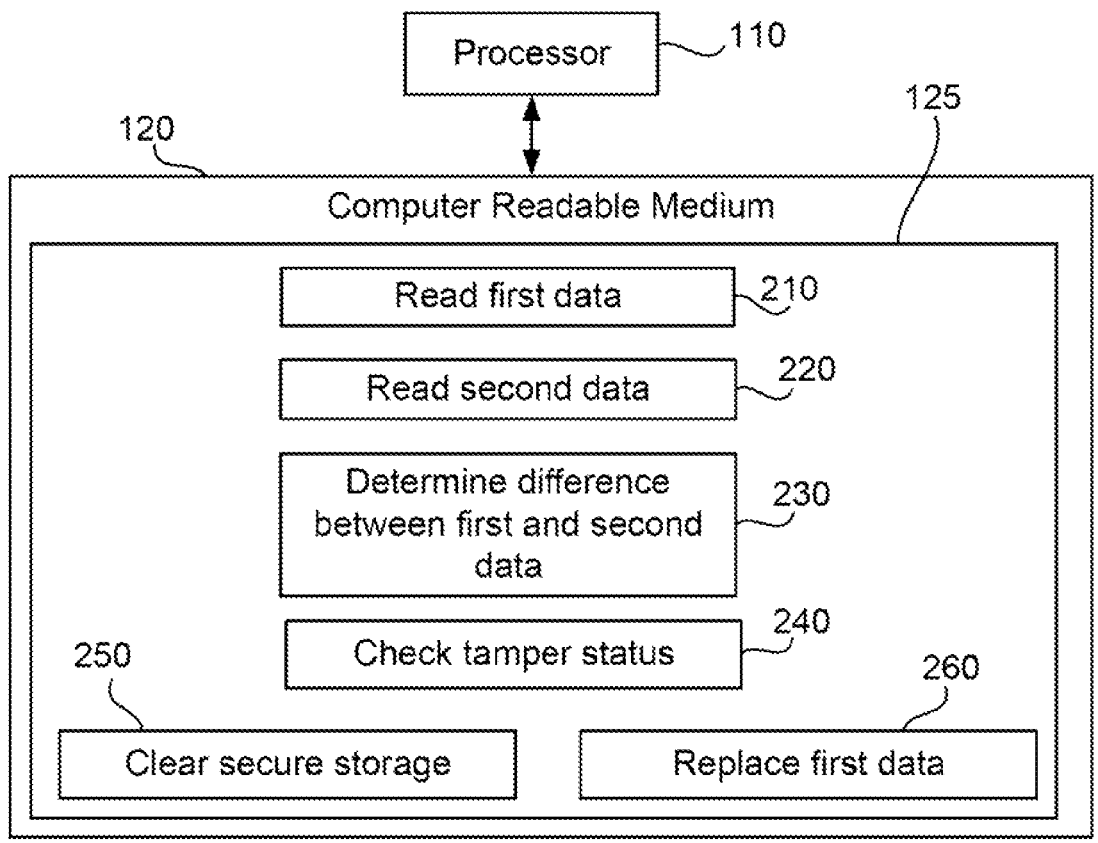
FIG. 2 shows an example of a storage medium having instructions suitable for use with examples of a computing device according to FIG. 1.

FIG. 2 shows an example of a storage medium 120 suitable for use with the computing device 100 of FIG. 1.

The storage medium 120 stores instructions 125 including instructions 210 to cause the processor 110 of a computing device (such as the computing device 100 of FIG. 1) to read the first configuration data 135 from the first storage device 130.

The instructions 125 further include instructions 220 to cause the processor 110 of the computing device 100 to read the second configuration data 145 from the second storage device 140. The instructions 125 further include instructions 230 to cause the processor 110 of the computing device 100 to determine whether there is an inconsistency between the first configuration data 135 and the second configuration data 145.

The instructions 125 include instructions 240 to check a tamper status of the computing device. Based on the tamper status and a determination that there is an inconsistency between the first configuration data 135 and the second configuration data 145, the instructions 125 cause the computing device 100 to either execute instructions 250 to clear a secure storage location 150 of the computing device 100, or to execute instructions 260 to replace the first configuration data 135 in the first storage device 130 based on the second configuration data 145 stored in the second storage device 140. The instructions 260 to replace the first configuration data 135 may also cause normal processing (e.g. start-up) of the computing device to continue.

In some examples, the instructions 125 may be performed by the computing device 100 during start-up of the computing device 100. For example, the instructions 125 may be executed before an operating system is loaded by a boot loader of the computing device 100. In some examples the instructions may be executed as part of a Power On Self-Test (POST) process.

In some examples, the determination that there is an inconsistency between the first configuration data 135 and the second configuration data 145 may indicate tampering or a corruption of the first configuration data 135. The tamper status may adjust whether the inconsistency is treated as malicious tampering or merely a corruption of the data. In some examples a response to a determination that the inconsistency is due to corruption may be different from a response to a determination that the inconsistency is due to tampering. For example, the response to corruption may focus on recovery of the normal operation of the computing device, while the response to tampering may be to secure (i.e. prevent access to) data stored by the computing device (e.g. data stored on a hard disk, stored keys, etc.)

In some examples a difference between the first configuration data 135 and the second configuration data 145 may indicate an inconsistency. However, in some examples the first configuration data 135 and the second configuration data 145 may be different and consistent. For example, when a legitimate change is made to the first configuration data 135 there may be a transition period before the second configuration data 145 is updated to match the changed first configuration data 135. The first configuration data 135 and the second configuration data 145 may include, or be associated with, metadata to allow authentication of changes. The metadata-based verification may permit the computing device 100 to distinguish between a state where the first configuration data 135 and the second configuration data 145 are different but consistent (e.g. during a transition period following a legitimate change may) from a state where the a difference between the first configuration data 135 and the second configuration data indicates an inconsistency between the first configuration data 135 and the second configuration data 145. The metadata may be or may include a hash-based message authentication code (HMAC) wrapper for updated data.

In some examples, the first configuration data 135 may include security information, such as a security token, a token for a BIOS password, a hash of a BIOS password, an administrator local access key, or a security policy setting, etc. (or any combination of these). An example of a security policy is an indication that a particular security measure is active or inactive. For example, where the computing device has a sensor to detect that a case of the computing device has been opened, a security policy may indicate how the computing device should respond to a detection that the case has been opened (e.g. ignore and take no action, warn the user at next start-up, force user authentication at next start-up, etc.)

The second configuration data 145 may be a previously made copy of configuration data as stored in the first storage device 130 at the time of making the copy. The copy may be a secure copy. For example, a secure copy may include authentication metadata, such as HMAC. The copy may correspond to a known good state of the configuration data. If the configuration data currently stored in the first storage device 130 (i.e. the first configuration data 135) is inconsistent with the second configuration data 145, it may indicate corruption or tampering of the first configuration data 135 in the first storage device 130. In some examples the first storage device 130 may be private SPI flash and the second storage device 140 may be storage in a trusted platform module (TPM), such as non-volatile (NV) flash in the TPM. The TPM is a secure platform component that provides cryptographic operations and secure data storage. FIG. 1 illustrates the second storage device 140 as an element of the computing device 100. However, in some examples the second storage device 140 may be external to the computing device 100. For example, the second storage device 140 may be storage accessible to the computing device 100 over a network (e.g. a wired or wireless network).

The first storage device 130 and second storage device 140 may be distinct storage devices. The first storage device 130 and second storage device 140 may be electrically isolated from each other. For example, an EpSC may have access to first storage device 130 (e.g. private SPI flash) that is electrically isolated from other components of the computing device 100.

In some examples, the instructions 240 to check a tamper status may be performed before, after, or at the same time as instructions 230 to determine whether an inconsistency between the first configuration data 135 and second configuration data 145 has been detected.

In some examples, instructions 240 checking a tamper status includes checking an indication of whether a physical tampering event has been detected by the computing device 100. For example, the computing device 100 may include a sensor that can detect potential tampering events, such as an occurrence of a case of the computing device 100 being opened. Thus, in some examples, the tamper status may Include an indication of whether opening of a case of the computing device 100 has been detected. If such a physical tampering event has been detected and the first configuration data 135 is Inconsistent with the second configuration data 146 this may be indicative of malicious physical tampering of the computing device 100.

In some examples the tamper status may include a tamper policy setting. The tamper policy setting may indicate that an inconsistency between the first configuration data 135 and the second configuration data 145 is sufficient to determine that physical tampering has occurred. For example, in a computing device 100 that does not have a sensor to detect physical tampering the tamper status may be set to respond to an inconsistency between the first configuration data 135 and the second configuration data 145 as tampering without further confirmation from a physical tamper sensor. On the other hand, the tamper policy setting may indicate that an inconsistency between the first configuration data 135 and the second configuration data 145 is not sufficient to determine that physical tampering has occurred. The tamper policy setting allows control of a balance between security and avoiding Interruption to normal usage of the computing device 100.

In some examples, the first configuration data 135 on the first storage device 130 may be updated or corrected based on the second configuration data 145 stored on the second storage device 140. For example, the second configuration data 145 may be copied to the first storage device 130 to replace the first configuration data 135. This may be in response to a determination that the first configuration data 135 and the second configuration data 145 are inconsistent and the tamper status indicates that no physical tampering event has been detected. This may correspond to a determination that the first configuration data 135 became corrupted in the absence of physical tampering, and the first configuration data 135 is to be repaired based on the second configuration data 145. In some examples, normal processing (e.g. a start-up process) of the computing device 100 may continue after the repair or replacement of the first configuration data 135.

In some examples, a secure storage location 150 may be cleared based on the tamper status and a detection of an inconsistency between the first configuration data 135 and the second configuration data 145. For example, when an inconsistency between the first 135 and second 145 configuration data is detected, and the tamper status indicates that a physical tampering event has occurred.

In some examples, when the inconsistency between the first configuration data 135 and second configuration data 145 is detected, and the tamper status indicates that a physical tampering event has occurred, a security challenge may be issued. For example, the security challenge may be issued via a user interface. The security challenge may seek to authenticate a user. For example, the security challenge may request entry of a BIOS password or BIOS password token. If the security challenge results in an authentication failure the secure storage location 150 may be cleared. On the other hand, if the security challenge results in an authentication success, the computing device may replace the first configuration data 135 on the first storage device 130 based on the second configuration data 145 stored on the second storage device 140. In some examples failure of the security challenge is the result of repeated failed attempts to authenticate the user (e.g. when a set number of incorrect BIOS password entries has been reached).

The secure storage location 150 may store data for accessing protected data. The data stored in the secure storage location 150 may be referred to as access data. For example, the secure storage location 150 may store a security token, a token for a password, a password hash, a certificate, an encryption key, or a combination thereof. In some examples, the secure storage may store a key for accessing an encrypted storage device (such as a hard drive protected by disk encryption). Clearing the secure storage location 150 may prevent an attacker from accessing the protected data. In some examples the secure storage may store a code signing key. In some examples, after the secure storage 150 has been cleared, access to protected data may be possible using a complex key or token that is not stored on the computing device. This may allow a user to recover the protected data while preventing the attacker from accessing the protected data.

In some examples the computing device 100 may be placed in a state in which the data in the secure storage (e.g. a security token) is intact. If the user is able to authenticate using the data in the secure storage location 150, missing or mis-matched configuration data (e.g. in the first storage device 130) may be recovered (e.g. based on corresponding data in the second configuration data 145 stored in the second storage device 140). The computing device 100 may then continue normal operation.

In some examples the computing device 100 may be placed in a state in which the secure storage location 150 is cleared (e.g. erasing security tokens from the computing device). This renders protected data inaccessible to an attacker.

In some examples the computing device 100 may be placed in a state in which the secure storage location 150 is cleared (e.g. erasing security tokens from the computing device) and, in addition, the first storage, second storage, and secure storage location 150 may be reverted to a default state (e.g. a factory default state). This renders protected data inaccessible to an attacker because the security tokens that allow access to the protected data are no longer available in the secure storage location 150 (e.g. TPM). In some examples, the computing device may be placed in this state when a user (e.g. an attacker) has tried and failed an authentication challenge (e.g. entry of a BIOS administrator password or a token for a BIOS administrator password) multiple times.

The secure storage location 150 is shown in FIG. 1 as separate from the second storage device 140, but in some examples the secure storage location 150 is provided within the second storage device 140. In some examples the second storage device 140 may be a TPM (e.g. NV storage in the TPM) and the secure storage location 150 may be within the TPM (e.g. a portion of the NV storage).

Figure 3:
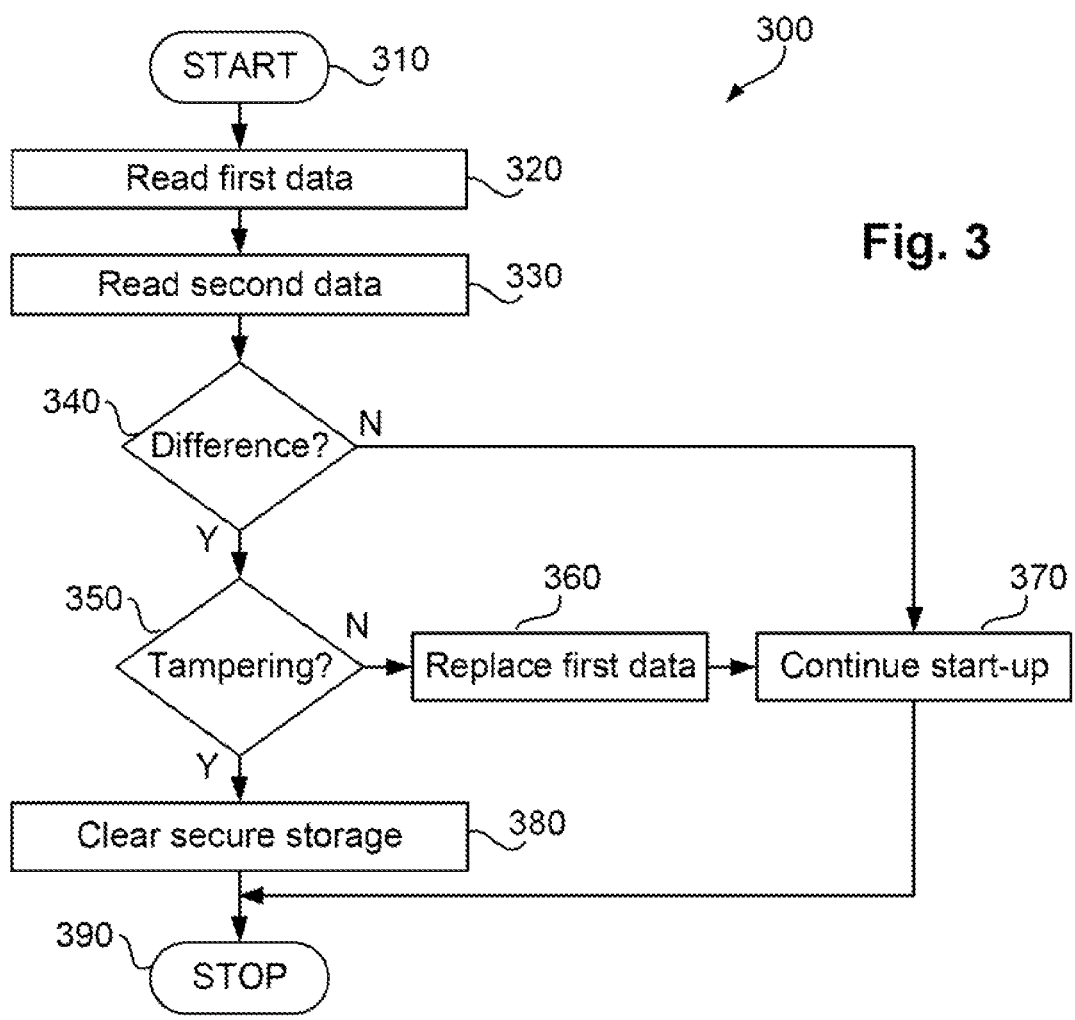
FIG. 3 shows an example of a method suitable for use with examples of a computing device according to FIG. 1.

FIG. 3 shows a method 300 of operating the computing device 100 of FIG. 1, according to some examples. The method 300 begins at 310 and at 320 first configuration data 135 is read from a first storage device 130. At 330 second configuration data 145 is read from a second storage device 140. At 340 it is determined if there is an inconsistency between the first configuration data 135 and the second configuration data 145. If there is no inconsistency the processing (e.g. start-up) of the computing device 100 continues as normal at 370. If an inconsistency is detected at 340 a tamper status is checked at 350. If it is determined that no tampering has taken place the first configuration data 135 may be replaced or repaired at 360 based on the second configuration data 145, and the normal processing (e.g. start-up) may then continue at 370. If, at 350, it is determined that tampering has taken place, a secure storage location 150 may be cleared, deleted, or wiped at 380. The method terminates at 390.

Figure 4:
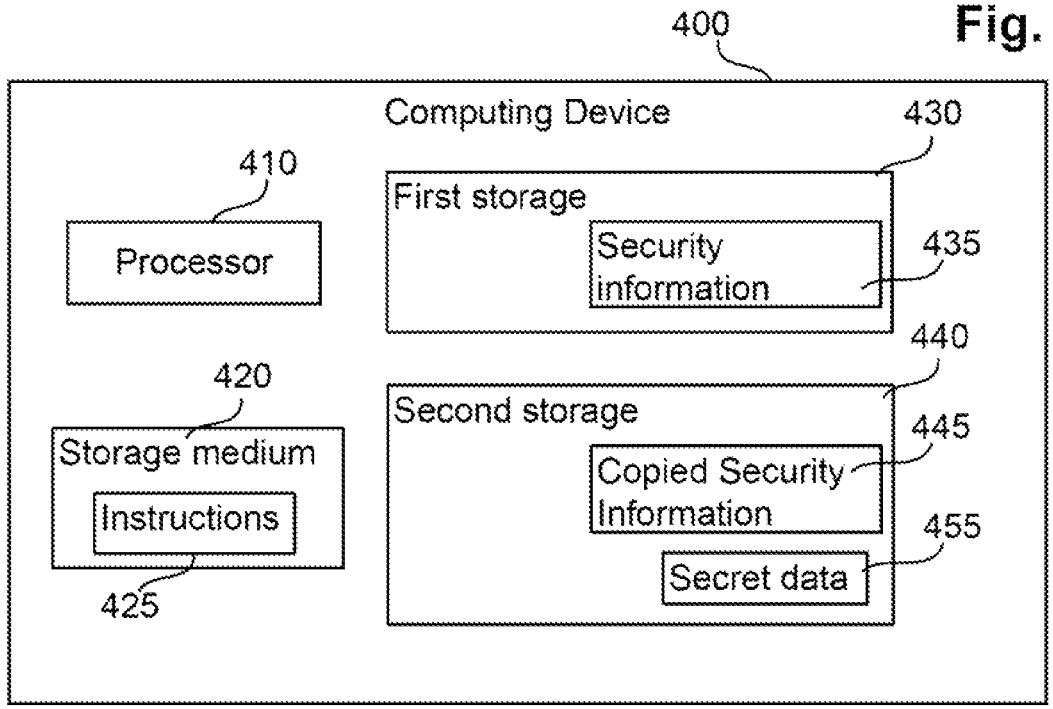
FIG. 4 shows an example of a computing device having copied security information stored with secret data.

FIG. 4 shows a computing device 400 according to an example. The computing device 400 includes a processor 410 for executing instructions 425 stored on a storage medium 420. The computing device also includes first storage 430 to store security information 435. Second storage 440 of the computing device 400 is to store a copy of the security information 445 and secret data 455.

Figure 5:
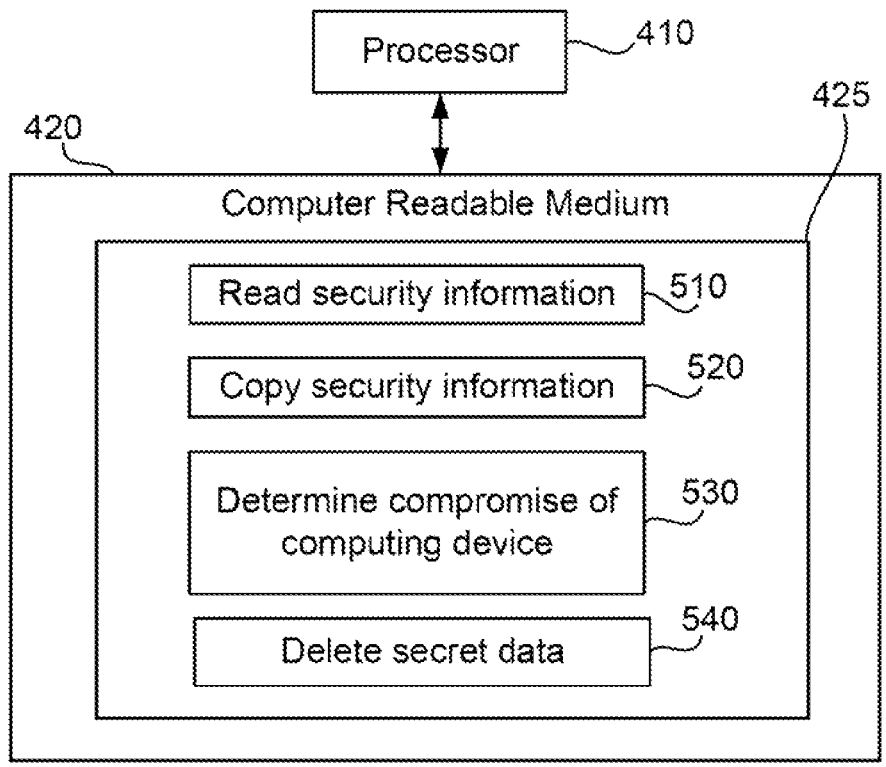
FIG. 5 shows an example of a storage medium having instructions suitable for use with examples of a computing device according to FIG. 4.

FIG. 5 shows an example of a storage medium 420 suitable for use with the computing device 400 of FIG. 4.

The storage medium 420 stores instructions 425 including instructions 510 to cause the processor 410 of a computing device (such as the computing device 400 of FIG. 4) to read the security Information 435 from the first storage 430. The security information may be used during start-up of the computing device 400. For example, the security information may be used before an operating system is loaded by a boot loader of the computing device 400. In some examples the security information 435 may be used during a POST process of the computing device 400.

The instructions 425 further include instructions 520 to cause the processor 410 of the computing device 400 to copy the security information to second storage 440 of the computing device 400. This may be a secure copy. The computing device 400 may determine whether the computing device 400 has been compromised based on the security information 435 and the copy of the security information 445. When it is determined that the computing device has been compromised, the instructions 540 cause the deletion of the secret data 455.

In some examples, an attack that attempts to replace or delete the security information 435 in the first storage 430 in order to compromise the computing device 400 would fail unless the same change is also made to the copy of the security information 445 in the second storage 440. If the security information 435 in the first storage 430 is modified by an attacker but the copied security information 445 in the second storage 440 is not, an Inconsistency between the security information 435 and the copy of the security information 445 may be detected, the potential compromise of the computing device 400 may be detected, and measures taken to mitigate the compromise.

As the copy of the security information 445 and the secret data 455 are stored in the same storage (second storage 440) it may be difficult for an attacker to tamper with the copy of the security information 445 without also altering or removing the secret data 155. For example, where the second storage 440 is secure storage it may be difficult to after individual items of data in the second storage 440 without suitable permissions or access to the computing device 400 (e.g. administrator access). Accordingly, an attempt by an attacker to delete or overwrite the copy of the security information 445 in the second storage 440 may also delete or overwrite the secret data 455.

Deletion of the secret data 455 may prevent the attacker from accessing the secret data 455. Where the secret data 455 protects protected data on the computing device 400 (e.g. where the secret data 455 includes a key for decrypting the protected data) the attacker may be prevented from accessing the protected data.

In some cases, when the secret data 455 is deleted a user may be alerted to potentially unauthorized changes being made to the computing device 400. For example, in a subsequent boot process the deletion of the secret data 455 may be detected and a user notified in response to the detection. The notification to the user may take the form of the computing device 400 being put in a state in which the computing device 400 is unable to boot until an authentication challenge is successfully passed. When an attacker modifies the secret data 455 and is unable to restore the original secret data 455, the attacker may be unable to prevent a user being alerted to the tampering. In some examples, the deletion of secret data 455 may be performed in a secure manner. For example, the state of the data to be deleted may be stored in an authenticated manner (e.g. using a HMAC wrapper for the state of the data being deleted). The deletion may then be authenticated and the data deleted from the second storage 440. The deleted data (including the metadata authenticating the deletion) may then be erased.

In some examples the determination of whether the computing device 400 has been compromised and the deletion of the secret data 455 may be carried out during start-up of the computing device 400. For example, the instructions 425 may be executed before an operating system is loaded by a boot loader of the computing device 400. In some examples the instructions 425 may be executed as part of a POST process of the computing device 400. In some examples, the determination of whether the computing device 400 has been compromised and the deletion of the secret data 455 may be carried out before the security information 435 is used in the start-up of the computing device 400.

In some examples, the security information 435 may include a security token, a token for a BIOS password, a hash of a BIOS password, an administrator local access key, or a security policy setting, etc., or any combination of these. An example of a security policy is an indication that a particular security measure is active or inactive. For example, where the computing device 400 has a sensor to detect that a case of the computing device 400 has been opened, a security policy may indicate how the computing device 400 should respond to a detection that the case has been opened (e.g. ignore and take no action, prevent booting until a security challenge has been passed, warn the user at next start-up, force user authentication at next start-up, etc.)

The copy of the security information 445 may correspond to a known good state of the security information 435 in the first storage 430. If, at the time of comparing the security information 435 and the copy of the security information 445, the security information 435 has been modified (during the time since the copy in the second storage 440 was produced) the security Information 435 will not be consistent with the copy of the security information 445. Such an inconsistency may indicate corruption of, or tampering with, the security information 435 in the first storage 430. In some examples, the security information 435 may be modified by a legitimate process, and in this case authentication metadata may allow the security information 435 and the copy of the security information 445 to be determined to be consistent, notwithstanding the modification of the security information 435.

In some examples the first storage 430 may be private SPI flash and the second storage 440 may be a trusted platform module (TPM). The first storage 430 and second storage 440 may be distinct storage devices. The first storage 430 and second storage 440 may be electrically isolated from each other.

In some examples it may be determined that the computing device 400 has been compromised when both (i) the security the security information 435 is determined to be inconsistent with the copy of the security information 445, and (ii) physical tampering of the computing device 400 has been detected.

In some examples, a determination that physical tampering has been detected may be based on a sensor of the computing device 400. The determination that physical tampering has been detected may be based on a detection that a case of the computing device 400 has been opened. In some examples the computing device 400 may include a sensor that detects opening of a case of the computing device 400.

In some examples the determination that the computing device 400 has been compromised includes determining that a tamper policy has been set. The tamper policy may indicate that the computing device is assumed to be compromised if the security information 435 is inconsistent with the copy of the security information 445. For example, in a computing device 400 that does not have a sensor to detect physical tampering, the tamper policy may be set to respond to an inconsistency between the security information 435 and the copy of the security information 445 as a compromise of the computing device 400 without further confirmation from a physical tamper sensor.

Figure 6:
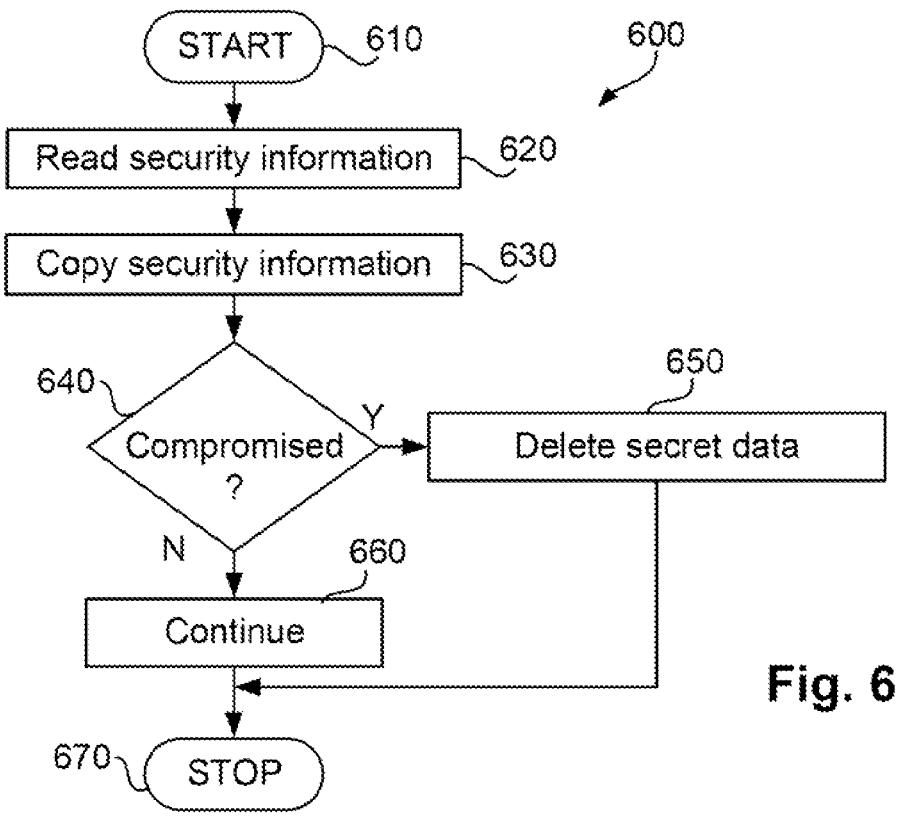
FIG. 6 shows an example of a method suitable for use with examples of a computing device according to FIG. 4.

FIG. 6 shows a method 600 of operating the computing device 400 of FIG. 4, according to some examples. The method begins at 810 and at 820 security information 435 is read from first storage 430. At 630 the security information 435 is copied to second storage 440. At 640 it is determined whether the computing device 400 has been compromised. This determination may be based on a comparison between the security information 435 and the copy of the security information 445. If it is determined that the computing device 400 has not been compromised, the computing device 400 may continue with normal processing (e.g. may continue with a start-up process) at 660. If, at 640, it is determined that the computing device 400 has been compromised, secret data 455, that is stored in the second storage 440, may be deleted at 660. The method terminates at 670.

In some examples the security information 435, 445 may include a BIOS security token for authenticating a user during start-up of the computing device 400, e.g. during POST. The computing device may be placed in a state in which the security information is deleted (or absent) from both the first storage 430 and the second storage 440. This may result in an authentication challenge being issued at POST based on the absent security token. In this case, the authentication challenge will always result in a failure to authenticate, since the corresponding security token is not available. This may prevent an attacker accessing data on the computing device 400. The state in which the security token is absent from the first storage 430 and the second storage 440 may be the result of (i) physical tampering (e.g. deletion or replacement of the first storage 430, the second storage 440, or both), (ii) deletion of the security token from the first storage 430, the second storage 440, or both in response to a determination that the computing device 400 has been compromised (possibly following multiple failed authorization attempts), or (iii) a combination of (i) and (ii).

Figure 7:
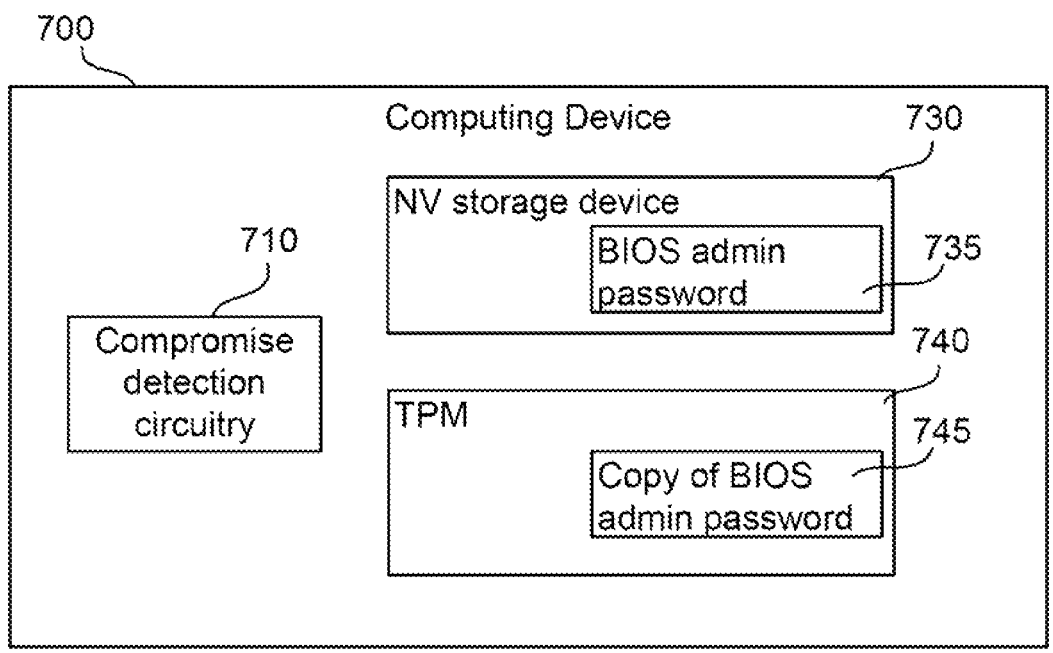
FIG. 7 shows an example of a computing device storing a copy of a token for a BIOS administrator password.

FIG. 7 shows a computing device 700 according to an example. The computing device 700 includes a non-volatile storage device 730. In some examples, the non-volatile storage device may be or may include private SPI storage 730. A description of a BIOS administrator password 735 (e.g. a token for a BIOS administrator password) may be stored on the non-volatile storage device 730. The computing device 700 also includes a TPM 740. A copy of the description of the BIOS administrator password 745 may be stored in the TPM. The computing device 700 also includes compromise detection circuitry 710 to determine whether the computing device 700 has been compromised based on a comparison of the description of the BIOS administrator password 735 stored in the non-volatile storage device 730 and the copy of the description of the BIOS administrator password 745 stored in the TPM 740. If the compromise detection circuitry 710 determines that the computing device 700 has been compromised, the compromise detection circuitry 710 deletes contents of the TPM 740.

A description of a BIOS administrator password 735 may include a token of the password, a hash of the password, or some other representation of the password. The description of a BIOS administrator password 735 may permit a determination of whether an entered password matches the BIOS administrator password.

Deleting contents of the TPM 740 may include deleting all of the contents of the TPM 740 or deleting a selected portion of the contents of the TPM 740. Deletion of contents of the TPM 740 may include deleting secret data, such as keys for accessing encrypted information stored on the computing device 700, code signing keys, etc. Deleting contents of the TPM 740 may include deleting a description of a password, a token of a password, a password hash, a certificate, an encryption key, or a combination thereof. Deletion of the secret data may prevent an attacker from accessing the secret data or from accessing data protected by a key in the secret data. The copy of the description of the BIOS administrator password 745 may be stored in NV storage of the TPM 740. Deleting contents of the TPM 740 may include deleting some or all of the contents of the NV storage of the TPM.

The compromise detection circuitry 710 may include a sensor to detect opening or removal of a case of the computing device 700. The compromise detection circuitry 710 may include a register or storage to store an indication of whether opening or removal of a case of the computing device 700 has been detected. The compromise detection circuitry 710 may include computer executable instructions, such as a software module, a firmware module, or a combination of these.

Figure 8:
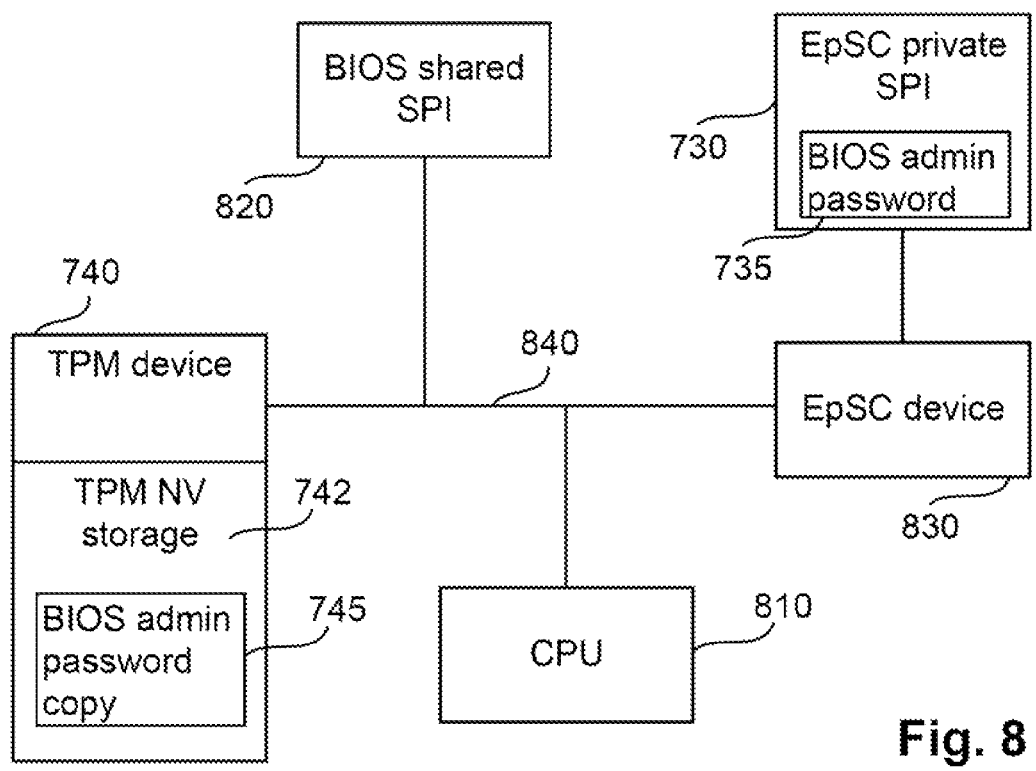
FIG. 8 shows an example of electrical infrastructure of a computing device suitable for use with examples of a computing device according to FIG. 7.

FIG. 8 shows an example of electrical infrastructure of a computing device 700 according to some examples. The computing device 700 may include an EpSC device 830 having associated private SPI storage. In this example, the private SPI storage acts as the non-volatile storage device 730 of FIG. 7. A description of a BIOS administrator password 735 may be stored on the private SPI storage 730. The EpSC device 830. TPM 740. BIOS shared SPI 820, and CPU 810 may share direct or indirect electrical connection, e.g. via a bus. In some examples, the CPU 810 may have an electrical connection to the EpSC device 830 but may lack an electrical connection to the EpSC private SPI storage 730. Accordingly, in this arrangement, electrical data access to the to the private SPI storage 730 passes through an interface exposed by the EpSC device 830. However, in this arrangement physical modification of the private SPI storage 730 may be possible, for example when an attacker has physical access to the private SPI storage 730 component. In some examples, data and code may be stored in the private SPI storage 730. In some examples, code may be signed, and data may be encrypted, have a HMAC, or both. The HMAC in this context may be for the data at rest on the private SPI storage device 730. Thus, when the security information (e.g. a description of a BIOS administrator password) is copied to the TPM 740 a HMAC of the data at rest may copied as part of the security information.

In some examples, determining whether the computing device has been compromised may be based on a determination whether the computing device 700 has been subject to physical tampering.

In some examples, it may be determined that the computing device 700 has been subject to physical tampering if a case status has been set to indicate that a case of the computing device 700 has been opened. In some examples, the case status may be represented by a flag or bit that is set or written in response to a detection by a sensor that the case has been opened. The sensor may be a physical switch, for example. In some examples an additional or alternative sensor may be provided to detect another type of physical tampering and the determination whether the computing device has been subject to physical tampering may be based on indications associated with the other type of physical tampering.

In some examples the tampering policy may include a setting to indicate that physical tampering is to be determined to have occurred if the description of the BIOS administrator password 735 stored in the non-volatile storage device 730 (e.g. private SPI storage) is inconsistent with the copy of the description of the BIOS administrator password 745 stored in the TPM 740.

In some examples the determination whether the computing device 700 has been compromised may be based on an outcome of an authentication challenge. For example, when the description of the BIOS administrator password 735 is determined to be inconsistent with the copy of the description of the BIOS administrator password 745, and it is determined that the computing device 700 has been subject to physical tampering, an authentication challenge may be issued. The challenge may be issued via a user interface device. In some examples the authentication challenge may be a request for entry of the BIOS administrator password. If the authentication challenge result is success (e.g. if the user successfully enters the BIOS administrator password) the description of the BIOS administrator password 735 stored in the non-volatile storage device 730 may be replaced or repaired based on the copy of the description of the BIOS administrator password 745 stored in the TPM 740. When the authentication challenge result is failure (e.g. if the user does not successfully enter the BIOS administrator password) the computing device 700 may be considered to be compromised and contents of the TPM 740 NV storage 742 may be deleted.

For the purpose of the authentication challenge, the copy of the description of the BIOS administrator password 745 stored in the TPM 740 may be used instead of the description of the BIOS administrator password 735 stored in the non-volatile storage device 730. That is, where the copy of the description of the BIOS administrator password 745 stored in the TPM 740 is Inconsistent with the description of the BIOS administrator password 735 stored in the non-volatile storage device 730, the copy of the description of the BIOS administrator password 745 stored in the TPM 740 may be treated as correct.

In some examples the computing device 700 may include a cover removal sensor. The cover removal sensor may be arranged to detect removal or opening of a case of the computing device 700. A first copy of a security policy may be stored in the non-volatile storage device, the security policy may indicate a response to be performed by the computing device 700 in response to detection of removal or opening of the case by the cover removal sensor. A second copy of the security policy may be stored in the TPM. The determination of whether the computing device 700 has been compromised may be based on (i) an indication from the cover removal sensor that the case of the computing device has been opened, (ii) an indication that the first copy of the security policy is inconsistent with the second copy of the security policy, or (iii) both.

Figure 9:
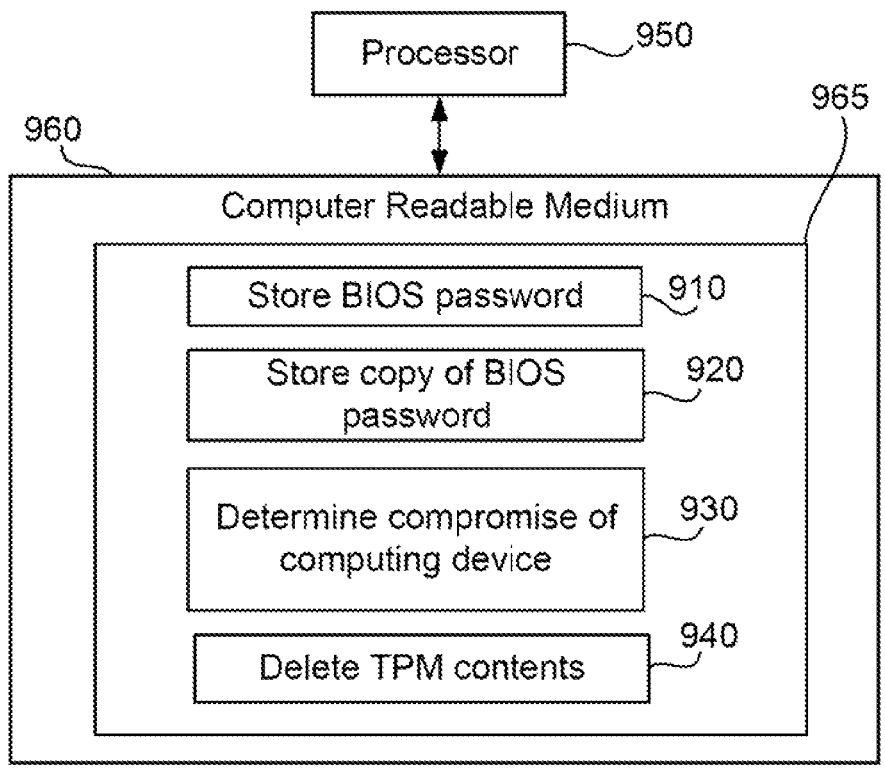
FIG. 9 shows an example of a storage medium having instructions suitable for use with examples of a computing device according to FIG. 7.

FIG. 9 shows an example of a storage medium 960 suitable for use with the computing device 700 of FIG. 7.

The storage medium 960 stores instructions 965 including instructions 910 to cause a processor 950 of a computing device (such as the computing device 700 of FIG. 7) to store a description of a BIOS administrator password 735 in non-volatile storage device 730. The instructions 965 further include instructions 920 to store a copy of the description of the BIOS administrator password 745 in the TPM 740. The instructions 965 include instructions 930 to determine whether the computing device 700 has been compromised. This determination may be based on a comparison between the description of the BIOS administrator password 735 stored in the non-volatile storage device 730 and the copy of the description of the BIOS administrator password 745 stored in the TPM 740. When it is determined that the computing device 700 has been compromised, instructions 940 cause contents of the TPM 740 to be deleted.

Figure 10:
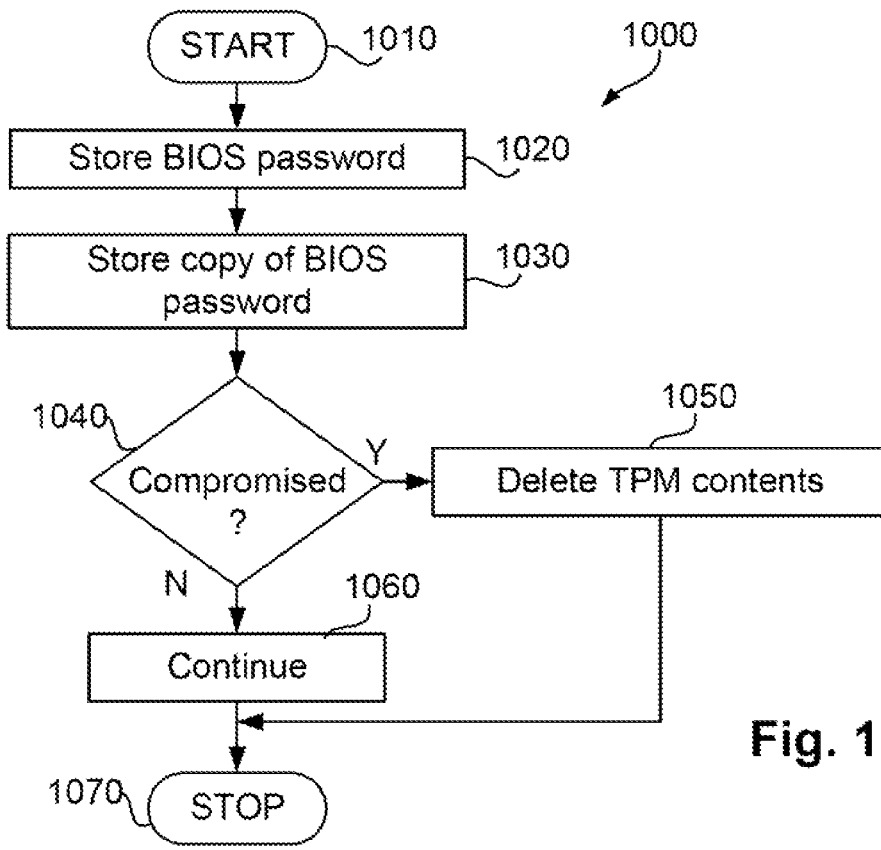
FIG. 10 shows an example of a method suitable for use with examples of a computing device according to FIG. 7.

FIG. 10 shows a method 1000 of operating the computing device 700 of FIG. 7, according to some examples. The method begins at 1010 and at 1020 a description of a BIOS administrator password 735 is stored in non-volatile storage device 730. At 1030 a copy of the description of the BIOS administrator password 745 is stored in the TPM 740. At 1040 it is determined whether the computing device 700 has been compromised. This determination may be based on a comparison between the description of the BIOS administrator password 735 stored in the non-volatile storage device 730 and the copy of the description of the BIOS administrator password 745 stored in the TPM 740. If it is determined that the computing device 700 has not been compromised, normal processing may continue 1060. If it is determined that the computing device 700 has been compromised, contents of the TPM 740 may be deleted at 1050. The method terminates at 1070

Figure 11:
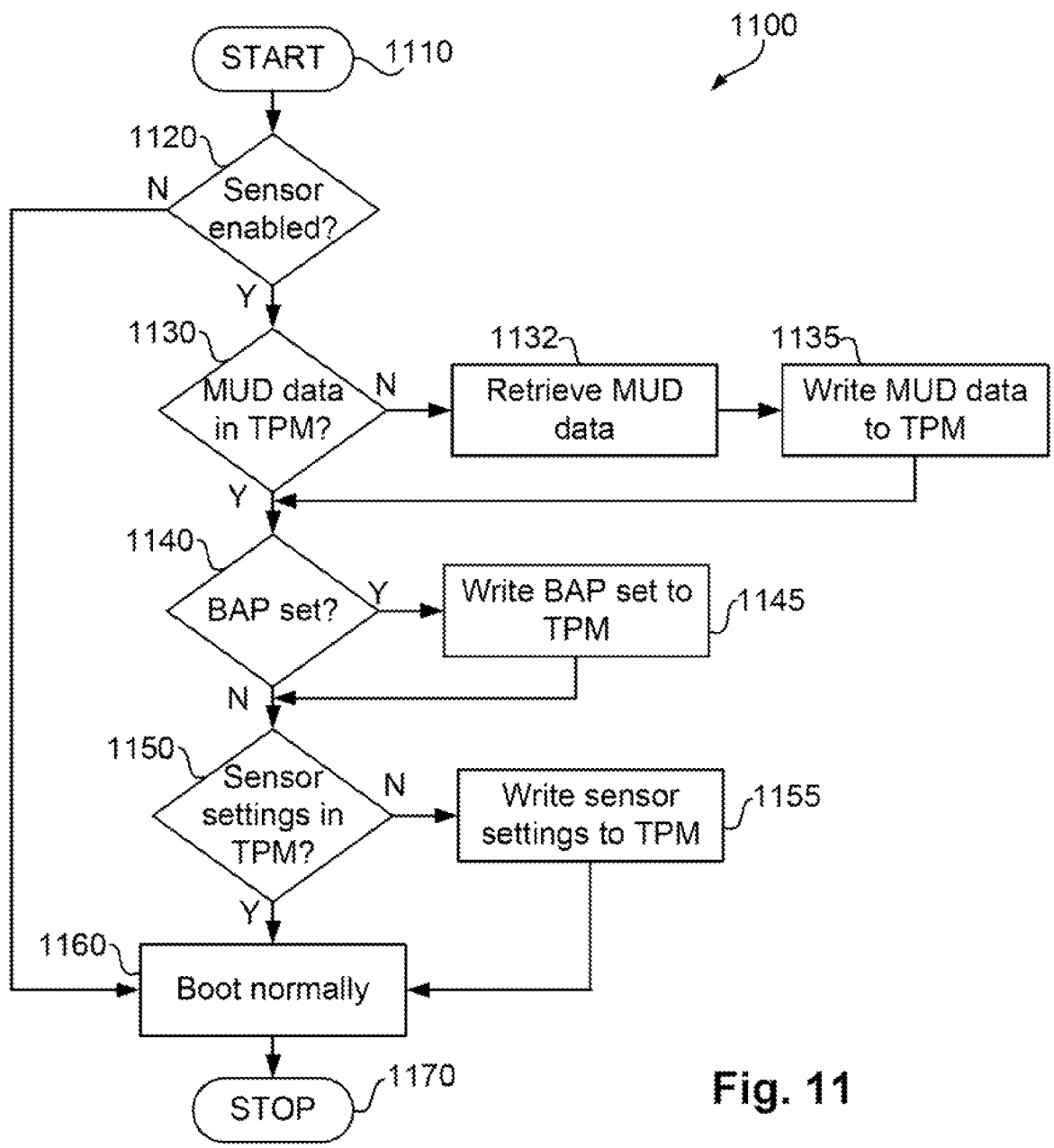
FIG. 11 shows an example of a method of configuring a computing device.

FIG. 11 shows a method 1100 of configuring a computing device according to some examples. The method 1100 may be implemented in some examples of computing devices 100, 400, 700 according to FIGS. 1, 4, and 7. In some examples, the method 1100 may be executed during a boot process. The method 1100 begins at 1110 and at 1120 a policy Is checked to determine whether a physical tamper sensor is enabled. This may include checking a setting in private SPI storage. The physical tamper sensor may sense opening of a case of the computing device. If the sensor is not enabled the method proceeds to 1160 and normal processing of the computing device resumes (e.g. the computing device boots normally). If, at 1120, the sensor is determined to be enabled, it is determined, at 1130, whether machine unique data (MUD) for identifying components of the computing device is stored in the TPM. If the MUD is in the TPM the method proceeds to 1140. If the MUD is not in the TPM, the MUD is received from the private SPI storage (at 1132) and the MUD is written to the TPM at 1135. The MUD may be included in configuration data 135, 145 or security information 435, 445. The method then proceeds to 1140.

At 1140 it is determined whether the BIOS administrator password has been set. If the BIOS administrator password is not set, the method proceeds to 1150. If the BIOS password is set, an indication that the BIOS administrator password is set is written to the TPM at 1145. A description of the BIOS administrator password, such as a hash, may be written to the TPM. The description of the BIOS administrator password may be included in configuration data 135, 145 or security information 435, 445. The method then progresses to 1150.

At 1150 it is determined whether settings associated with the physical tamper sensor are stored in the TPM. The setting may include an indication whether the sensor is enabled. If the sensor settings are stored in the TPM the method may proceed to 1160. If the settings are not stored in the TPM, the settings may be written to the TPM at 1155 and the method proceeds to 1160. At 1160 the boot process may continue normally. The settings may be included in configuration data 135, 145 or security information 435, 445. The process terminates at 1170.

In some examples additional information may be copied to the TPM in a similar manner. In some examples MUD may be written to the TPM a single time and may then remain unaltered. In some examples the description of the BIOS administrator password may be written to the TPM when (whenever) the computing device is booted, when (whenever) the BIOS administrator password changes, or both.

Figure 12:
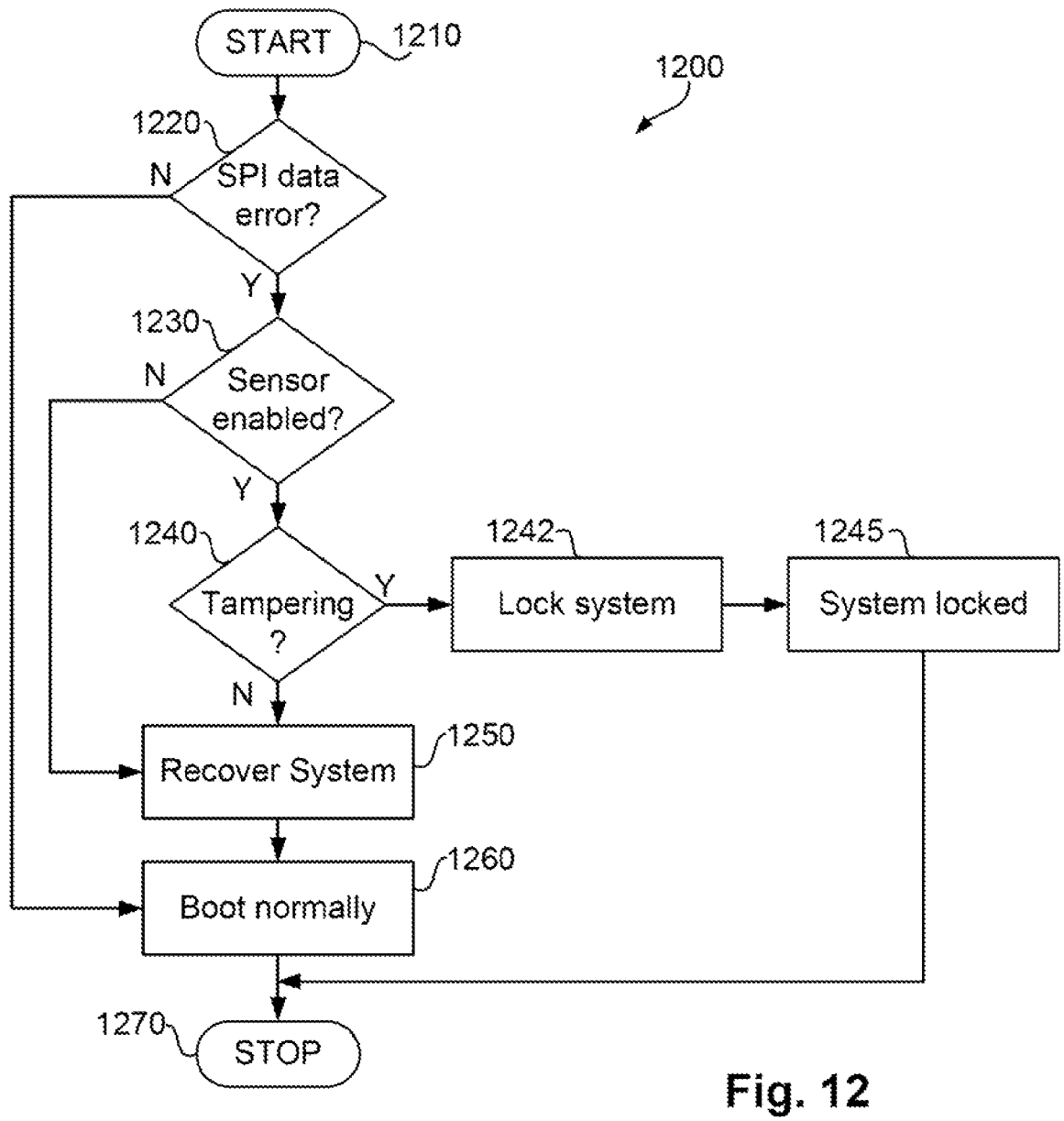
FIG. 12 shows an example of a method of tamper detection.

FIG. 12 shows a method 1200 of tamper detection that may be used in the devices 100, 400, 700 of FIGS. 1, 4, and 7, according to some examples. In some examples, the method of FIG. 12 may be performed during a boot process of the computing device.

The method begins at 1210. At 1220 it is determined whether there is a data error in the private SPI storage. This may include comparing data stored in the private SPI storage with corresponding (e.g. copied or mirrored) data In the TPM. If there is no error, the computing device may continue to boot normally at 1260.

If, at 1220, a data error is detected it may indicate corruption of data or tampering. In response, it is determined, at 1230, whether a physical tamper sensor is enabled. This may include checking an indication in private SPI storage or the TPM. If the physical tamper sensor is not enabled, the system may be recovered at 1250. For example, the data in the private SPI storage may be replaced or repaired based on the corresponding data stored in the TPM (e.g. by copying the corresponding data stored in the TPM to the private SPI storage). The computing device may then continue with normal processing (e.g. by continuing to boot normally) at 1260.

If, at 1230, the physical tamper sensor is enabled, it may be determined, at 1240, whether physical tampering has been detected. This determination may be based on an output or indication from the physical tamper sensor. If tampering has not been detected, the system may be recovered, at 1250, (e.g. by repairing corrupted data) and may continue with normal processing (e.g. by continuing to boot normally) at 1260.

If tampering has been detected at 1240, the computing device may be locked at 1242. For example, an indication may be written to the TPM to Indicate that the computing device is to be locked. The computing device may then be in a locked state at 1245, such that the computing device will not boot until an authentication challenge has been successfully completed, e.g. by a user entering a valid BIOS administrator password. The method terminates at 1270.

Figure 13:
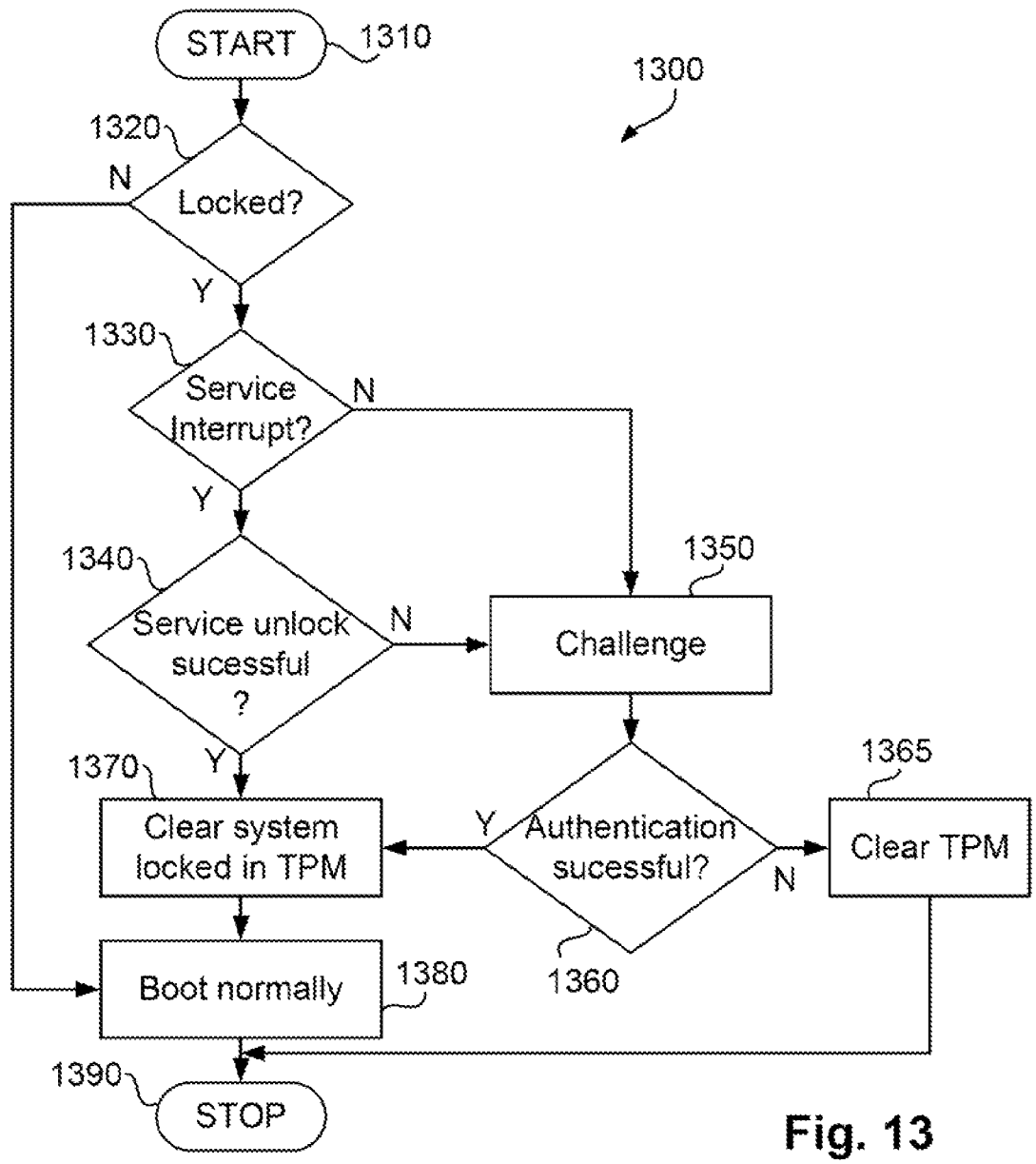
FIG. 13 shows an example of a method of unlocking a computing device.

FIG. 13 illustrates an unlock process according to some examples. The method 1300 may be implemented in the computing devices 100, 400, 700 of FIGS. 1, 4, and 7. The method 1300 begins at 1310. At 1320 it is determined whether the computing device has been locked. This may include checking a flag or indication in the TPM. If the computing device is not locked, processing continues as normal (e.g. a boot process may continue) at 1380. If the computing device Is locked, it is determined whether a service interrupt has been detected at 1330. A service interrupt may include a previously defined input from a user interface, such as a set combination of key presses in order to run a cryptographically signed command to execute a service unlock. Where the service interrupt is detected at 1330 a service unlock may be attempted at 1340. The service unlock may include clearing or resetting certain Information in the computing device, such as resetting a BIOS to factory defaults. If the service unlock is successful, the lock status may be unset in the TPM at 1370 and the boot process may continue at 1380. If, at 1330, no service interrupt is detected, or if, at 1340, the service unlock is unsuccessful, a challenge may be issued at 1350. For example, the challenge may be an authentication challenge issued to the user via a user interface. The challenge may include prompting a user to enter a BIOS administrator password, for example. If, at 1360, the challenge is successful, e.g. if the user successfully completes the authentication, the computing device Is unlocked by updating the locked indication in the TPM at 1370 and the normal processing continues at 1380. If, at 1360, the authentication is unsuccessful, the TPM may be cleared at 1365, e.g. by deleting secret data in the TPM, or by deleting all data in the TPM. In some examples, the challenge may allow the user multiple attempts (e.g. a pre-set number of opportunities to enter the BIOS password) to successfully authenticate at 1350 before concluding that the authentication is unsuccessful at 1360. In some examples, after an unsuccessful authentication at 1360, processing may return to 1350 and re-issue the challenge (e.g. an unlimited number of times), instead of clearing the TPM. The method terminates at 1390.

In some examples the method 1300 may be carried out as part of a boot process.

In some examples a BIOS security token may be stored in the private SPI storage and in the TPM. The BIOS security token may be for authenticating a user during start-up of the computing device 400, e.g. during POST. A user may be forced to authenticate themselves, based on the BIOS security token, in order to complete a start-up of the computing device. When the BIOS security token is absent from the private SPI storage and the TPM, the authentication will fail and the computing device may become unbootable. In this state an attacker may be prevented from accessing data stored on the computing device. The absence of the BIOS security token from the private SPI storage and the TPM may be due to replacement of the data or component by an attacker, or may be performed by the computing device in response to detected tampering (e.g. clearing the TPM in 1365). A combination of tampering and the detection of the tampering may result in the BIOS security token being absent from the private SPI storage and the TPM. For example. An attacker may replace the information of the private SPI storage (thereby removing the BIOS security token from the private SPI storage). In response to the detection of this tampering, the contents of the TPM may be deleted by the computing device, removing the BIOS security token from the TPM. In this state, authentication based on the BIOS security token is not possible.

Figure 14:
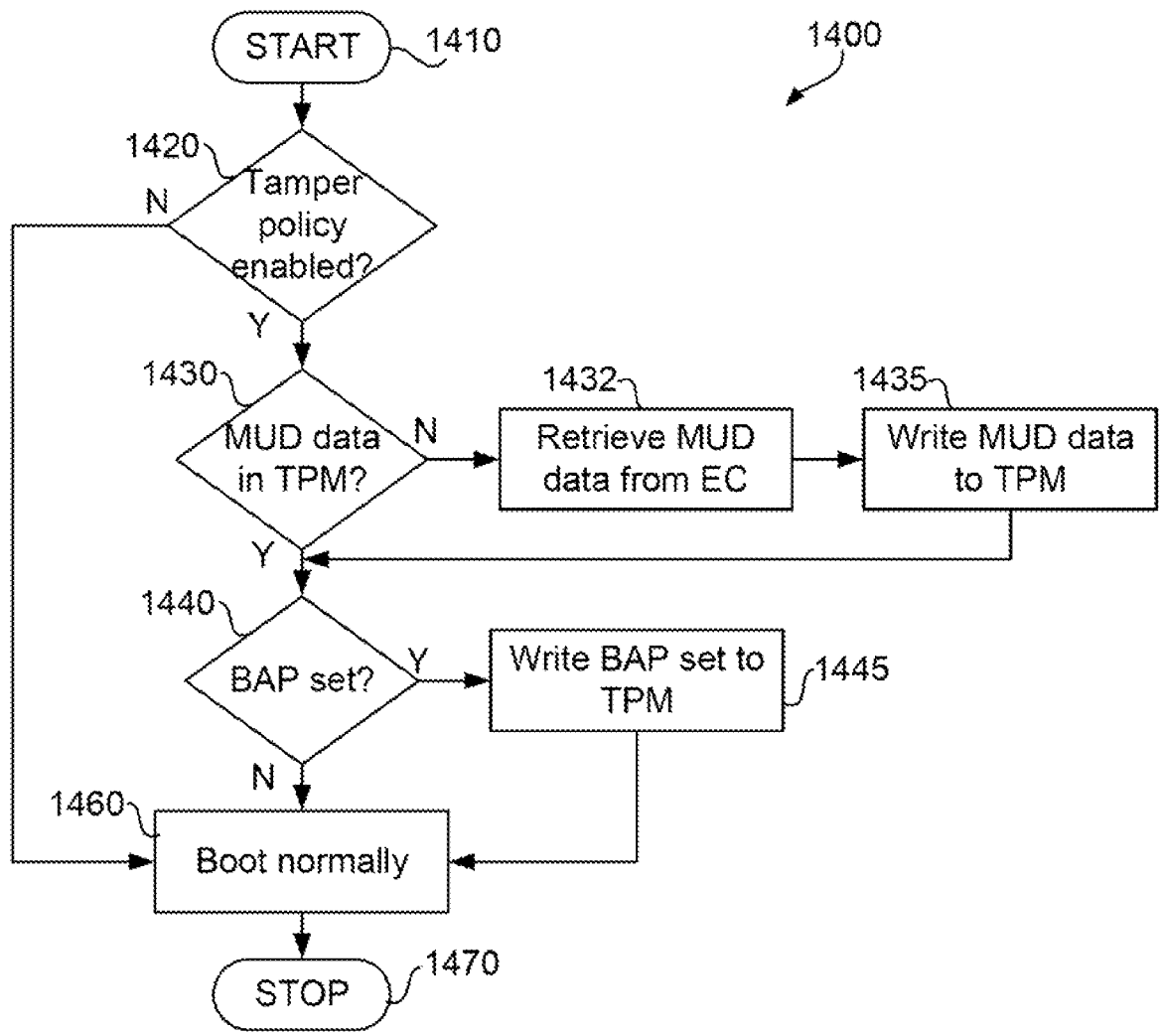
FIG. 14 shows an example of a method of configuring a computing device.

FIG. 14 shows a method 1400 of configuring a computing device according to some examples. The method 1400 may be implemented in the computing devices 100, 400, 700 of FIGS. 1, 4, and 7. The method 1400 may be used in computing devices where a physical tampering detection sensor is absent or is not in use, for example. The method may be executed during a boot process. The method begins at 1410 and at 1420 it is determined whether a tamper policy is enabled. This may include checking a setting in private SPI storage. If the tamper policy is not enabled the method proceeds in a similar manner to the method of FIG. 11 when a physical tamper sensor is not enabled, by continuing with normal processing (e.g. booting) at 1460. If the tamper policy is enabled, the method proceeds in a similar manner to the method 1100 of FIG. 11 when a physical tamper sensor is enabled, with the exception of operations 1150 and 1155 relating to writing a sensor setting to the TPM. That is, if the tamper policy is enabled, it is determined, at 1430, whether MUD is stored in the TPM. If the MUD is in the TPM the method proceeds to 1440. If the MUD is not in the TPM, the MUD is received from the private SPI storage (at 1432) and the MUD is written to the TPM at 1435. The method then proceeds to 1440.

At 1440 it is determined whether a BIOS administrator password has been set. If the BIOS administrator password is not set, the method proceeds to 1460. If the BIOS administrator password is set, an indication that the BIOS administrator password is set is written to the TPM at 1445. A description of the BIOS administrator password, such as a hash of the password, may be written to the TPM. The method then progresses to 1460, where normal processing continues. The method terminates at 1470.

Figure 15:
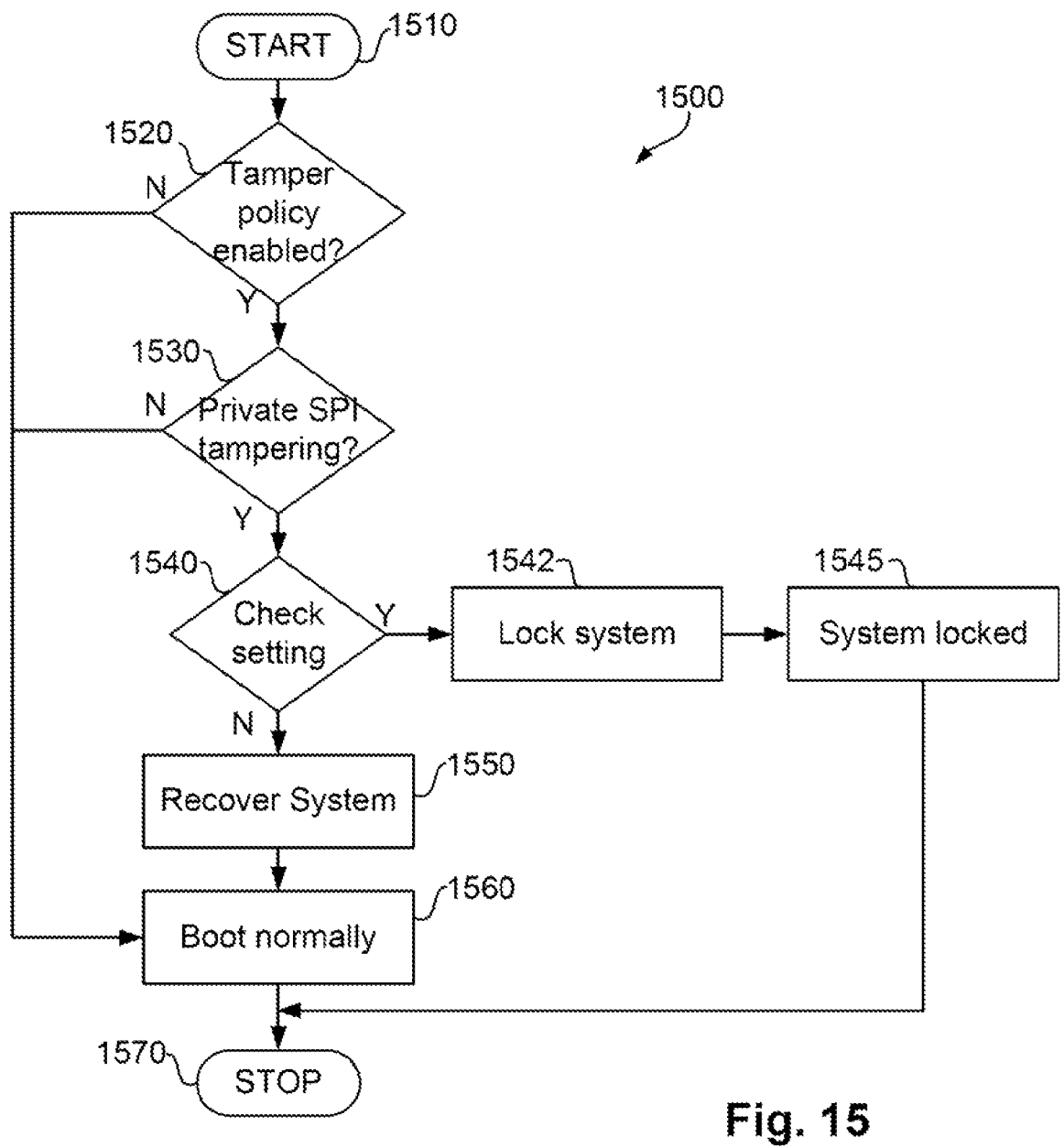
FIG. 15 shows an example of a method of tamper detection.

FIG. 15 shows a method 1500 of tamper detection that may be used in the devices 100, 400, 700 of FIGS. 1, 4, and 7, according to some examples. The method 1500 may be used in computing devices where a physical tampering detection sensor is absent or is not in use, for example. In some examples, the method 1600 of FIG. 15 may be performed during a boot process of the computing device.

The method 1500 begins at 1510. At 1520 it is determined whether a tamper policy has been enabled. This may Include checking an indication in private SPI storage or TPM. If the tamper policy is not enabled, the method may continue with normal processing (e.g. continuing to boot normally) at 1560.

If, at 1520, the tamper policy is enabled, it may be determined, at 1530, whether private SPI storage tampering is detected. This may include comparing data stored in the private SPI storage with corresponding (e.g. copied or mirrored) data in the TPM. If no tampering is detected, the computing device may continue with normal processing at 1560. If tampering is detected at 1530, the method proceeds to 1540. In some examples, the tamper policy being set indicates that an inconsistency between (i) data stored in the private SPI storage and (ii) corresponding data in the TPM is to be treated as an indication that the private SPI storage has been tampered with.

At 1540 a setting stored in the TPM may be checked. The setting may indicate whether an authentication process has been set. An example of an authentication process is the use of a BIOS administrator password. If the authentication process has not been set, the system may be recovered at 1550. For example, the data in the private SPI storage may be replaced or repaired based on the corresponding data stored in the TPM (e.g. by copying the corresponding data stored in the TPM to the private SPI storage). The computing device may then continue with normal processing at 1560.

If, at 1540, the authentication process has been set, the computing device may be locked at 1542, for example by writing to the TPM an indication that the computing device is to be locked. The computing device may then be in a locked state at 1545, such that the computing device will not boot (e.g. placed in an unbootable state) until an authentication challenge has been successfully completed, e.g. by a user entering a valid BIOS administrator password. The method terminates at 1570.

Operations described herein may be carried out by a computing device. The computing device may execute, e.g. using a processor, instructions stored on a computer-readable storage medium. The computer-readable instructions may be in any suitable form that may be executed by a processor. For example, the code may be implemented in software, firmware, or a combination of these.

A computer-readable storage medium may be any electronic, magnetic, optical, or other physical storage device that contains or stores executable instructions. Computer-readable storage medium may be, for example, Random Access Memory (RAM), an Electrically Erasable Programmable Read-Only Memory (EEPROM), a storage drive, a Compact Disc Read Only Memory (CD-ROM), and the like. As such, the computer-readable storage medium can be non-transitory. The term "non-transitory" does not encompass transitory propagating signals.

A processor may be, or may include, a Central Processing Unit (CPU), Graphics Processing Unit (GPU), Embedded Controller (EC), microprocessor, etc. suitable for retrieval and execution of instructions, electronic circuits configured to perform the operations stored on computer-readable storage media, or a combination thereof. In some examples, the processor may include a plurality of processing elements.

Throughout the description and claims of this specification, the words "comprise", "contain", and variations of them mean "including but not limited to", and they are not intended to (and do not) exclude other components, integers, or operations. Throughout the description and claims of this specification, the singular encompasses the plural unless the context implies otherwise. In particular, where the indefinite article is used, the specification is to be understood as contemplating plurality as well as singularity, unless the context implies otherwise.

Features, integers and characteristics described in conjunction with a particular aspect or example are to be understood to be applicable to any other aspect or example described herein unless incompatible therewith. All of the features disclosed in this specification (including any accompanying claims, abstract, and drawings), and all of the operations of any method or process so disclosed, may be combined in any combination, except combinations where at least some of such features or operations are mutually exclusive. Examples are not restricted to the details of any foregoing examples. The Examples may extend to any novel one, or any novel combination, of the features disclosed in this specification (including any accompanying claims, abstract, and drawings), or to any novel one, or any novel combination, of the operations of any method or process so disclosed.

The readers attention is directed to all papers and documents which are filed concurrently with or previous to this specification in connection with this application and which are open to public inspection with this specification, and the contents of all such papers and documents are incorporated herein by reference.

Example implementations can also be realised according to the following clauses:

Example 1: A non-transitory computer-readable storage medium storing thereon instructions that, when executed, cause a processor of a computing device to: read, during start-up of the computing device, first configuration data from a first storage device of the computing device; read second configuration data from a second storage device of the computing device; determine that there is an inconsistency between the first configuration data and the second configuration data; check a tamper status of the computing device; based on the tamper status and the determination that there is an inconsistency between the first configuration data and the second configuration data: (i) clear a secure storage location of the computing device, the secure storage location storing data to access protected data; or (ii) replace the first configuration data on the first storage device of the computing device based on second data and continue the start-up of the computing device.

Example 2: The non-transitory computer-readable storage medium of Example 1, wherein the tamper status includes: an indication that a physical tampering event has been detected by the computing device; or a tamper policy setting Indicating whether the inconsistency between the first configuration data and the second configuration data is sufficient to determine that a physical tampering event has been detected by the computing device.

Example 3: The non-transitory computer-readable storage medium of Example 2, wherein the instructions, when executed, further cause the processor to: in response to the determination that there is an inconsistency between the first configuration data and the second configuration data, and the determination that a physical tampering event has been detected by the computing device, issue a security challenge; and (i) clear the secure storage location of the computing device when the security challenge result is an authentication failure, or (ii) replace the first configuration data on the first storage device of the computing device when the security challenge result is an authentication success.

Example 4: The non-transitory computer-readable storage medium of any one of Examples 1 to 3, wherein the tamper status includes an indication whether opening of a case of the computing device has been detected.

Example 5: The non-transitory computer-readable storage medium of any one of Examples 1 to 4, wherein the instructions, when executed, further cause the processor to: store in the secure storage location of the computing device a security token, a token of a password, a password hash, a certificate, an encryption key, or a combination thereof.

Example 6: A non-transitory computer-readable storage medium storing thereon instructions that, when executed, cause a processor of a computing device to: read security information from first storage of the computing device, the security information for use on start-up of the computing device; copy the security information to second storage of the computing device, the second storage further storing secret data; determine, based on a comparison of the security information stored on the first storage of the computing device with the copied security information stored on the second storage of the computing device that the computing device has been compromised; and in response to the determination that the computing device has been compromised, delete the secret data.

Example 7: The non-transitory computer-readable storage medium of Example 6, wherein the instructions, when executed, further cause the processor to: determine that the computing device has been compromised when: the security information stored on the first storage of the computing device is determined to be inconsistent with the copied security information stored on the second storage of the computing device; and physical tampering of the computing device has been detected.

Example 8: The non-transitory computer-readable storage medium of Example 7, wherein the detection of physical tampering includes a detection that a case of the computing device has been opened.

Example 9: The non-transitory computer-readable storage medium of Example 6, wherein the instructions, when executed, further cause the processor to: determine that a tamper policy has been set; if the tamper policy has been set, determine that the computing device has been compromised if the security information stored on the first storage of the computing device is determined to be inconsistent with the copied security information stored on the second storage of the computing device.

Example 10: The non-transitory computer-readable storage medium of anyone of Examples 6 to 9, wherein the second storage of the computing device is a trusted platform module (TPM).

Example 11: A computing device comprising: non-volatile storage device to store a description of a BIOS administrator password; a trusted platform module (TPM) to store a copy of the description of the BIOS administrator password; compromise detection circuitry to: determine whether the computing device has been compromised based on a comparison between the description of the BIOS administrator password stored in the non-volatile storage device and the copy of the description of the BIOS administrator password stored in the TPM, and in response to a determination that the computing device has been compromised, delete contents of the TPM.

Example 12: The computing device of Example 11, wherein: determining whether the computing device has been compromised is further based on a determination whether the computing device has been subject to physical tampering, wherein the computing device has been subject to physical tampering when: a case status has been set to indicate that a case of the computing device has been opened, or a tampering policy is set indicating that physical tampering is to be determined if the description of the BIOS administrator password stored in the non-volatile storage device is inconsistent with the copy of the description of the BIOS administrator password stored in the TPM.

Example 13: The computing device of Example 12, wherein determining whether the computing device has been compromised is further based on an outcome of an authentication challenge.

Example 14: The computing device of any one of Examples 11 to 13, wherein deleting contents of the TPM includes deleting a security token, a token of a password, a password hash, a certificate, an encryption key, or a combination thereof.

Example 15: The computing device of any one of Examples 11 to 14, further comprising: a cover removal sensor to detect opening of a case of the computing device, wherein a first copy of a security policy is stored in the non-volatile storage device indicating a response of the computing device to detection of opening of the case, a second copy of the security policy is stored in the TPM, the determination whether the computing device has been compromised is based on an indication from the cover removal sensor that the case of the computing device has been opened, an indication that the first copy of the security policy is inconsistent with the second copy of the security policy, or both.

The invention claimed is:

1. A non-transitory computer-readable storage medium storing thereon instructions that, when executed, cause a processor of a computing device to:
read, during start-up of the computing device, first configuration data from a first storage device of the computing device;
read second configuration data from a second storage device of the computing device, wherein the second storage device is not the same as the first storage device, and wherein the second configuration data is a previously made copy of the first configuration data stored on the second storage device;
determine that there is an inconsistency between the first configuration data and the second configuration data;
check a tamper status of the computing device;
clear a secure storage location of the computing device, the secure storage location storing data to access protected data, when the tamper status of the computing device that is checked indicates tampering; and
replace the first configuration data on the first storage device of the computing device based on second data and continue the start-up of the computing device, when the tamper status of the computing device that is checked indicates no tampering.

2. The non-transitory computer-readable storage medium of claim 1, wherein the tamper status includes:
a tamper policy setting indicating whether the inconsistency between the first configuration data and the second configuration data is sufficient to determine that a physical tampering event has been detected by the computing device.

3. The non-transitory computer-readable storage medium of claim 2, wherein:
the tamper status indicates tampering, and
the instructions, when executed, further cause the processor to:
determine, in accordance with the tamper policy setting, that the inconsistency between the first configuration data and the second configuration data is sufficient and a physical tampering event has been detected by the computing device; and
issue a security challenge;
clear the secure storage location of the computing device when a result of the security challenge is an authentication failure, and
replace the first configuration data on the first storage device of the computing device when the result of the security challenge is an authentication success.

4. The non-transitory computer-readable storage medium of claim 1, wherein the tamper status indicates whether opening of a case of the computing device has been detected.

5. The non-transitory computer-readable storage medium of claim 1, wherein the instructions, when executed, further cause the processor to:
store in the secure storage location of the computing device a security token, a token of a password, a password hash, a certificate, an encryption key, or a combination thereof.

6. A non-transitory computer-readable storage medium storing thereon instructions that, when executed, cause a processor of a computing device to:
read security information from first storage of the computing device, the security information for use on start-up of the computing device;
determine, based on a comparison of the security information stored on the first storage of the computing device with a copy of the security information stored on a second storage of the computing device that the computing device has been compromised, wherein the copy of the security information is a previously made copy of the security information stored on the second storage of the computing device, wherein the second storage further stores secret data, and wherein the second storage is not the same as the first storage; and
in response to the determination that the computing device has been compromised, delete the secret data.

7. The non-transitory computer-readable storage medium of claim 6, wherein the instructions, when executed, further cause the processor to:
determine that the computing device has been compromised when:
the security information stored on the first storage of the computing device is determined to be inconsistent with the previously made copy of the security information stored on the second storage of the computing device; and
physical tampering of the computing device has been detected.

8. The non-transitory computer-readable storage medium of claim 7, wherein the detection of physical tampering includes a detection that a case of the computing device has been opened.

9. The non-transitory computer-readable storage medium of claim 6, wherein the instructions, when executed, further cause the processor to:
determine that a tamper policy has been set;
determine that the computing device has been compromised based on the tamper policy having been set, and further based on the security information stored on the first storage of the computing device being inconsistent with the copy of the security information stored on the second storage of the computing device.

10. The non-transitory computer-readable storage medium of claim 6, wherein the second storage of the computing device is a trusted platform module (TPM).

11. A computing device comprising:
non-volatile storage device to store a description of a BIOS administrator password;
a trusted platform module (TPM) to store a copy of the description of the BIOS administrator password, wherein the copy of the description is a previously made copy of the description stored in the non-volatile storage device;
compromise detection circuitry to:
determine whether the computing device has been compromised based on a comparison between the description of the BIOS administrator password stored in the non-volatile storage device and the copy of the description of the BIOS administrator password stored in the TPM, and
in response to a determination that the computing device has been compromised, delete contents of the TPM.

12. The computing device of claim 11, wherein:
determining whether the computing device has been compromised is further based on a determination whether the computing device has been subject to physical tampering, wherein the computing device has been subject to physical tampering when:
a case status has been set to indicate that a case of the computing device has been opened, or
a tampering policy is set indicating that physical tampering is to be determined if the description of the BIOS administrator password stored in the non-volatile storage device is inconsistent with the copy of the description of the BIOS administrator password stored in the TPM.

13. The computing device of claim 12, wherein determining whether the computing device has been compromised is further based on an outcome of an authentication challenge.

14. The computing device of claim 11, wherein deleting contents of the TPM includes deleting a security token, a token of a password, a password hash, a certificate, an encryption key, or a combination thereof.

15. The computing device of claim 11, further comprising:
a cover removal sensor to detect opening of a case of the computing device, wherein
a first copy of a security policy is stored in the non-volatile storage device indicating a response of the computing device to detection of opening of the case,
a second copy of the security policy is stored in the TPM,
the determination whether the computing device has been compromised is based on an indication from the cover removal sensor that the case of the computing device has been opened, an indication that the first copy of the security policy is inconsistent with the second copy of the security policy, or both.

* * * * *